(12) United States Patent
Rose et al.

(10) Patent No.: US 9,988,821 B2
(45) Date of Patent: Jun. 5, 2018

(54) FLOOR COVERING ELEMENT WITH SLIP RESISTANT BACKING

(71) Applicant: WPT GmbH, Detmold (DE)

(72) Inventors: Stefan Rose, Warstein (DE); Ulrich Windmöller, Schloss Holte-Stukenbrock (DE)

(73) Assignee: WPT GmbH, Detmold (DE)

( * ) Notice: Subject to any disclaimer, the term of this patent is extended or adjusted under 35 U.S.C. 154(b) by 0 days. days.

(21) Appl. No.: 15/404,409

(22) Filed: Jan. 12, 2017

(65) Prior Publication Data

US 2017/0204619 A1 Jul. 20, 2017

(30) Foreign Application Priority Data

Jan. 15, 2016 (EP) ..................... 16151426

(51) Int. Cl.
*E04F 15/10* (2006.01)
*E04F 15/02* (2006.01)
*E04F 15/22* (2006.01)
*B32B 3/30* (2006.01)
*B32B 5/02* (2006.01)
*B32B 27/08* (2006.01)
*B32B 27/12* (2006.01)
*B32B 27/40* (2006.01)
*B32B 3/06* (2006.01)

(52) U.S. Cl.
CPC ............. *E04F 15/107* (2013.01); *B32B 3/06* (2013.01); *B32B 3/30* (2013.01); *B32B 5/02* (2013.01); *B32B 27/08* (2013.01); *B32B 27/12* (2013.01); *B32B 27/40* (2013.01); *E04F 15/02038* (2013.01); *E04F 15/02172* (2013.01); *E04F 15/225* (2013.01); *B32B 2262/101* (2013.01); *B32B 2307/51* (2013.01); *B32B 2307/536* (2013.01); *B32B 2307/718* (2013.01); *B32B 2307/72* (2013.01); *B32B 2471/02* (2013.01)

(58) Field of Classification Search
CPC ............. E04F 15/02033; E04F 15/107; E04F 15/02038; E04F 15/02172; E04F 15/225
USPC .............................. 52/591.1, 591.4
See application file for complete search history.

(56) References Cited

U.S. PATENT DOCUMENTS

| 444,042 | A | * | 1/1891 | Brock | ............. | E04F 13/10 |
| | | | | | | 52/578 |
| 604,325 | A | * | 5/1898 | Hopkins | ............. | E04F 15/02 |
| | | | | | | 52/392 |
| 1,156,753 | A | * | 10/1915 | Carey | ............. | E04F 15/04 |
| | | | | | | 52/591.4 |
| 7,506,481 | B2 | * | 3/2009 | Grafenauer | ............. | E04B 5/12 |
| | | | | | | 52/592.1 |

(Continued)

FOREIGN PATENT DOCUMENTS

| CH | 586334 A5 | 3/1977 |
| EP | 2883712 A1 | 6/2015 |

*Primary Examiner* — Adriana Figueroa
(74) *Attorney, Agent, or Firm* — Richard M. Goldberg

(57) ABSTRACT

A floor panel (10, 100) with an average density of between 1.5 and 2.5 g/cm$^3$ and a mass per unit area (EN ISO 23997) of between 3.5 and 8 kg/m$^2$, includes at least one soft elastic core layer (12) made from a PU material and a non-slip backing (22) having an embossing, with the lateral edges of the floor panel (10, 100) being contrived such that two adjacently installed floor panels (10, 100) abut against each other along their lateral edges in a non-locking manner.

11 Claims, 1 Drawing Sheet

(56) References Cited

U.S. PATENT DOCUMENTS

| | | | | |
|---|---|---|---|---|
| 8,156,710 B1* | 4/2012 | Pien | ................... | E04F 15/105 |
| | | | | 52/177 |
| 8,298,650 B2* | 10/2012 | Reichwein | ............. | B32B 25/14 |
| | | | | 428/156 |
| 8,549,807 B2* | 10/2013 | Meersseman | ............ | B32B 7/12 |
| | | | | 52/313 |
| 8,689,513 B2* | 4/2014 | Windmoller | ............ | E04F 15/02 |
| | | | | 52/588.1 |
| 8,703,275 B2* | 4/2014 | Reichwein | ........ | E04F 15/02038 |
| | | | | 428/156 |
| 8,733,063 B2* | 5/2014 | Song | ...................... | E04F 15/02 |
| | | | | 52/311.1 |
| 8,800,245 B1* | 8/2014 | Pien | ................... | E04F 15/107 |
| | | | | 428/411.1 |
| 9,057,193 B2* | 6/2015 | Amend | ................... | B05D 1/02 |
| 9,624,678 B2* | 4/2017 | Segaert | ............... | E04F 15/107 |
| 2003/0221387 A1* | 12/2003 | Shah | ...................... | B32B 21/08 |
| | | | | 52/592.1 |
| 2005/0166514 A1* | 8/2005 | Pervan | ................... | B27F 5/026 |
| | | | | 52/578 |
| 2006/0156663 A1* | 7/2006 | Mao | ........................ | B32B 3/30 |
| | | | | 52/403.1 |
| 2006/0179773 A1* | 8/2006 | Pervan | ................... | B27N 7/00 |
| | | | | 52/592.1 |
| 2013/0227904 A1* | 9/2013 | Amend | ................... | E04C 2/26 |
| | | | | 52/309.11 |
| 2016/0053496 A1* | 2/2016 | Sosnowski | ........ | E04F 15/02038 |
| | | | | 52/588.1 |

* cited by examiner

FLOOR COVERING ELEMENT WITH SLIP RESISTANT BACKING

BACKGROUND OF THE INVENTION

The present invention concerns a floor panel.

Floor coverings exist in a large variety of embodiments. The floor panels which comprise the flooring may be tiles or boards made from plastic materials with a certain elasticity and flexibility. The installation can be performed using a floating technique ("loose lay"). The advantage is a simple, tidy installation. Furthermore, the flooring can easily be dismantled if need be, leaving no residues. This is an advantage over an installation method where the panels are bonded to the substrate.

The resultant flooring should be as level and even as possible, and the floor panels should be installed close to each other to achieve this. It is also desirable to prevent the loose laid floor panels from moving and shifting on top of the substrate in order to prevent the formation of joints into which dirt can penetrate. It is generally desirable that the floor panels lie flush on top of the substrate and, once installed, form a single entity with the latter, without a mechanical connection or adhesive bond being formed with the surface of the substrate. If need be, it should be possible and easy to replace individual panels without having to take apart large areas of the compound structure of the flooring.

Hence it is a task of this invention to develop a floor panel to form a flooring which, even when installed using a floating technique, forms a good connection with the substrate and creates an even compound structure which can easily be dismantled and permits easy replacement of individual panels.

This task is solved according to the invention by a floor panel with the features of the claims.

SUMMARY OF THE INVENTION

The floor panel used to form flooring according to the invention has a mass per unit area according to ISO 23997 of 3.5-8.0 kg/m². Its density is somewhere between 1.5 and 2.5 g/cm³. It comprises a soft elastic core layer of polyurethane material (PU) and a non-slip backing with embossing. This backing ensures good contact with the substrate whilst the softness and elasticity of the floor panel ensure a snug fit with the substrate. At the same time, the floor panel's high mass per unit area ensures that it lies flush on top of the substrate.

The lateral edges of the floor panel are contrived such that two adjacently installed panels abut against each other along their lateral edges in a lock-free manner. This means that adjacent panels can be moved laterally without resistance, i.e. horizontally towards each other, or into each other, and can easily be detached from each other in the opposite direction. Adjacent floor panels therefore abut against each other along their edges in such a manner that the desired tight surface is formed with a compact finish. An entirely abutting connection is possible, in which each panel has a fully vertical abutting surface. Variations are also possible in this context, in the form of non-vertical abutting surfaces, or several abutting surfaces which are offset in relation to each other at different heights.

The combination of above-mentioned features leads to the formation of a floor panel which can be used to create a tightly installed and flush lying flooring when installed using a floating technique. Individual panels can be removed from the flooring, and replaced, relatively easily.

The backing is preferably formed by the underside of an elastic backing layer made from a polyurethane material disposed underneath the core layer. The materials used for the core layer and the backing layer may differ with regard to the formulation of the polyurethane, or may be identical, or may differ with regard to the fillers they contain.

In an alternative embodiment of this invention, the backing is formed by the underside of the core layer itself.

Further, the embossing on the backing preferably has a honeycomb structure or a pyramid structure. The protrusions of the honeycombs or pyramids come into direct contact with the substrate, but can be slightly depressed, allowing them to adapt to the substrate. The honeycomb or pyramid structure forms a profiling with an anti-slip effect.

Further, the lateral edges preferably have a chamfer on the top and bottom sides of the floor panel. The chamfer at the top serves to form a joint at the transition between the adjacent floor panels, which may be desired for design-related reasons. The chamfer at the bottom of the floor panel is intended to receive dirt, dust or foreign bodies which may collect between the lateral edges of the panels pushed together during installation.

Further, the panel preferably has tongue-and-groove profiles along its lateral edges, contrived in such a way that grooves and tongues on opposite lateral edges of adjacent floor panels can be pushed into each other in the horizontal direction in a non-locking manner. This sliding into each other creates a tongue-and-groove connection which allows the two panels to be easily pulled apart again, with no resistance, during dismantling for the purpose of releasing the connection. Due to the elasticity and softness of the core layer, the tongue-and-groove connection can also allow one floor panel to be lifted up from the flooring in relation to the other panel, during which the tongue, due to the compressibility of the core layer, can be somewhat compressed and the lateral edges of both floor panels can slide across each other in the vertical direction. In this case, the tongue-and-groove connection is sufficiently stable to ensure a secure connection between adjacent floor panels once installed, but also flexible enough to allow a single floor panel to be lifted up out of the compound structure of the flooring against a certain resistance.

In this case, the tongues and grooves of the tongue-and-groove profiles preferably each have an approximately trapezoidal cross-section with beveled flanks. This cross-section facilitates the extraction of a single floor panel as the beveled flanks of the interconnecting tongues and grooves can slide apart over each other.

The chamfer on the underside of the floor panel is preferably bigger than that on the top side. This means that a relatively large gap is formed between two adjacent floor panels on the underside of the flooring, which is limited by the chamfers at this position, whereas the joint on the top of the flooring remains relatively small. This may be desirable to prevent dirt from collecting in this joint.

Further, the core layer at least preferably contains fillers in order to increase the weight. These may be mineral fillers. Other layers of the floor panel may also contain similar fillers.

Further, the floor panel according to the invention preferably additionally comprises a glass-fiber mat which lies on top of, or in, the core layer. This glass-fiber mat serves to stabilize the multilayer compound structure.

Further, the floor panel preferably comprises a decorative layer and a transparent utility layer covering this decorative layer.

According to another embodiment of the invention, the floor panel has a textile layer forming the top of the floor panel. This textile layer forms e.g. a pile so that the floor panel can be used like a carpet tile.

Further, the floor panel according to the invention exhibits a deflection of less than 20 mm according to EN ISO 24344.

Further, the backing preferably exhibits a residual indentation of less than 0.1 mm according to EN ISO 24343.

Further, the floor panel preferably exhibits a Shore A hardness of 50 to 90.

BRIEF DESCRIPTION OF THE DRAWINGS

Preferred embodiments of the present invention will be described in more detail below with reference to the drawings, in which.

DETAILED DESCRIPTION

Figure 1:
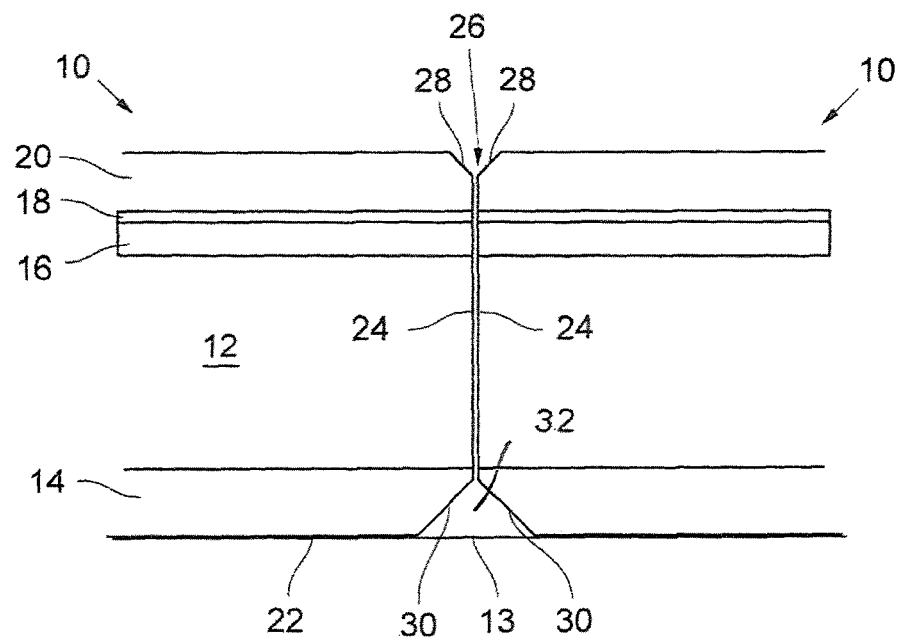
FIGS. 1 and 2 are cross-sections through adjacently installed floor panels according to a first and second form of embodiment of the present invention.

FIG. 1 shows two adjacently installed identical floor panels 10 for use in creating a flooring placed on a substrate 13. Each floor panel 10 comprises a core layer 12 made from a soft elastic polyurethane material. This material contains predominantly polyurethane and, in addition, mineral fillers for the purpose of increasing the weight. Floor panel 10 has an average density of between 1.5 and 2.5 g/cm$^3$ and a mass per unit area according to EN ISO 23997 of between 3.5 and 8.0 kg/m$^2$.

Disposed underneath core layer 12 in the present embodiment there is a backing layer 14 which may also be made from polyurethane. Differing from the embodiment shown here, the core layer 12 and backing layer 14 can be contrived in one piece as a single layer.

Disposed on top of core layer 12 there is a glass-fiber mat 16 in the dimension of floor panel 10, which also improves the indentation performance. Disposed on top of glass fiber mat 16 there is a decorative layer 18 and a transparent utility layer 20 covering decorative layer 18. On its underside, floor panel 10 has a non-slip backing 22, which is either disposed on the underside of backing layer 14, as shown in the present example embodiment, or directly on the underside of core layer 12, if core layer 12 itself forms the underside of floor panel 10. Backing 22 has non-slip characteristics. These can be provided by the material on the one hand, which is freely exposed on the underside of floor panel 10, i.e. in the present example embodiment, by the material of backing layer 14, and, in addition, by embossing such as a honeycomb structure or a pyramid structure. This embossing ensures profiling which hinders lateral slippage of floor panel 10 across the substrate.

Due to its relatively high mass per unit area, floor panel 10 sits heavy and flush on top of substrate 13. Due to its non-slip backing 22, it cannot easily be moved sidewards. The elasticity of floor panel 10 also ensures good adaptation to any unevenness in substrate 13.

Floor panel 10 exhibits a deflection according to EN ISO 24344 of less than 20 mm, and a residual indentation according to EN ISO 24343 of less than 0.1 mm. Further, the underside of floor panel 10 exhibits a Shore A hardness of 50 to 90.

In the present embodiment, floor panel 10 has, along its lateral edges, a vertical abutting surface 24 for the purpose of forming an abutting connection with an adjacently installed floor panel 10. According to FIG. 1, the two adjacently installed floor panels 10 therefore abut against each other along their vertical abutting surfaces 24 in a lock-free manner, hence closing off joint 26 between them. On the top side of floor panels 10, the latter are each provided with a chamfer 28 so that a joint with a triangular cross-section remains open on the top side of floor elements 10. This joint has only a shallow depth so that dirt or similar cannot penetrate between abutting surfaces 24.

Beneath abutting surfaces 24, on the underside of floor panels 10, there are chamfers 30 on the lateral edges, by means of which a gap 32 with a triangular cross-section is formed between floor panels 10 on substrate 12. Dirt can collect in this gap 32 when floor panels 10 are pushed together. This facilitates a tidy floating installation on top of the substrate.

In the embodiment shown in FIG. 1, floor panels 10 are installed adjacently, end to end, with abutting surfaces 24 in contact with each other. A single floor panel 10 can therefore be removed from the floor compound structure by lifting up from substrate 12, without also having to lift up adjacent floor panels 10. The elasticity of floor panels 10 facilitates this procedure. Hence individual floor panels 10 can be replaced without having to dismantle large areas of the compound structure.

Figure 2:
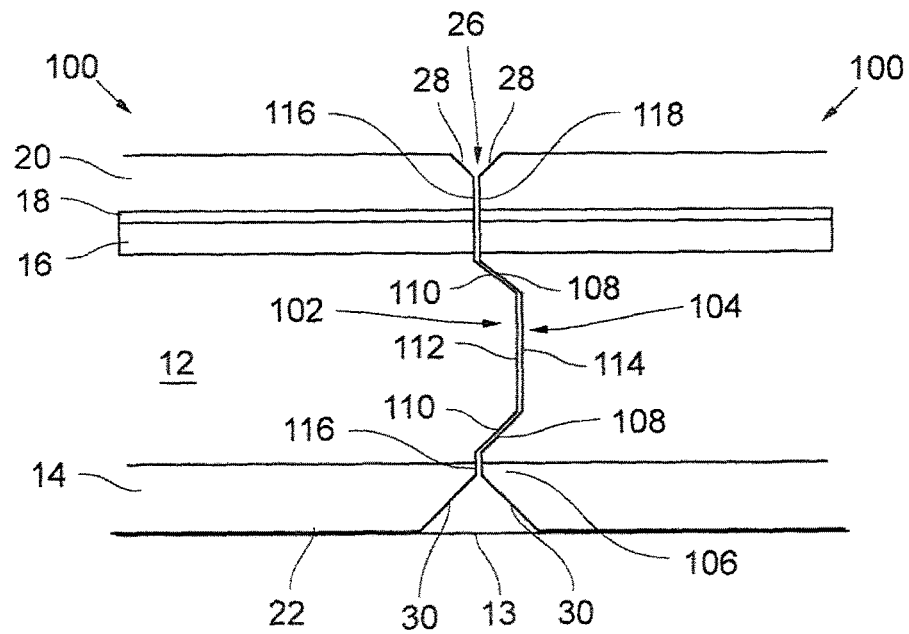

In the embodiment shown in FIG. 2, floor panels 100 have the same layer structure as the floor panels 10 in FIG. 1. The material characteristics in respect of density, mass per unit area, deflection, residual indentation and hardness are the same, too. Chamfers 28 and 30 are formed on the top and bottom sides of floor panels 100, on the lateral edges, as in FIG. 1.

Floor panels 100 in FIG. 2 are, however, profiled along their lateral edges. Namely, they exhibit tongue-and-groove profiles which can be inserted into each other in the horizontal direction in non-locking manner. Specifically, floor panel 100 exhibits, on the right hand side of FIG. 2, a trapezoidal shaped groove 104, which protrudes forward from the lateral edge of floor panel 100 on the right in FIG. 2. A tongue 102 with the same cross-section is contrived in the left-hand floor panel 100. If floor panels 100 are pushed towards each other in the horizontal direction on top of substrate 12, so that their lateral edges abut against each other, tongue 102 fits inside groove 104, thereby closing off the joint at the connection between the two floor panels 100. The gap between floor panels 100 is therefore more reliably closed in the vertical direction than is the case in the embodiment shown in FIG. 1.

Even in this case, however, an individual floor panel 100 can still be lifted out of the floor compound structure by lifting it up from substrate 12. This is due to the elasticity and compressibility of soft elastic core layer 12. If, namely, the right-hand floor panel 100 shown in FIG. 2, for example, is lifted vertically along its lateral edge, tongue 102 can move slightly towards the middle of the left-hand floor panel 100 and compress itself so that the part 106 of the lateral edge of right-hand floor panel 100 limiting the bottom of groove 104, can slide over and past it. Furthermore, this part 106, will undergo some lateral compression when it comes into contact with tongue 102 and will therefore cede. It can therefore slide up and past tongue 102 so that floor panel 100 can easily be extracted. A certain resistance has to be applied for this purpose, and this prevents the compound structure of the flooring from disassembling once installed, whilst still readily permitting extraction as described above with the use of a certain amount of force. Renewed insertion of a floor panel 100 in the opposite direction is possible without problem.

This above-described procedure for extracting a single floor panel 100 is facilitated by the fact that both tongue 102 and groove 104 are contrived to be approximately trapezoidal and therefore have beveled flanks 108, 110. During lifting, the lower beveled flank 108 of groove 104 therefore comes into contact with the corresponding bottom beveled flank 110 of tongue 102, slides over the latter and presses tongue 102 inwards as previously described.

The embodiment of floor panel 100 in FIG. 2 also has vertical abutting surfaces along the lateral edges, namely on the top side 112 of tongue 102 and on the base 114 of groove 104, as well as on the left-hand floor panel 100 above and below tongue 102 in the form of abutting surfaces 116 and above and below groove 104 in the form of further abutting surfaces 118. In the assembled state of floor panel 100, the contacting abutting surfaces 116 and 118 above and below the tongue-and-groove connection are horizontally offset in relation to abutting surfaces 112 and 114 within the tongue-and-groove connection.

Floor panels 100 of the present embodiment also have a non-slip backing 22 with embossing in the form of a honeycomb structure or a pyramid structure.

The thickness of floor panels 10, 100 with the above-described structure (with decorative layer 18 and utility layer 20) is, for example, between 4 and 5 mm.

In the two embodiments of floor panels 10, 100, a textile upper layer may be disposed on top of core layer 12 instead of decorative layer 18 and utility layer 20. This textile top layer may be a pile or similar. Floor panel 10, 100 can then be used like a carpet tile. The thickness of such a floor panel 10, 100 is between 2 and 3 mm, for example, excluding the textile layer.

The invention claimed is:

1. A floor panel comprising:
   an average density of between 1.5 and 2.5 g/cm3 and a mass per unit area (EN ISO 23997) of between 3.5 and 8 kg/m2,
   at least one soft elastic, compressible core layer made from a polyurethane material,
   a non-slip backing with an embossing, and
   lateral edges of the floor panel being contrived such that two adjacently installed floor panels abut against each other along their lateral edges in a non-locking manner,
   wherein the floor panel has, along its lateral edges, at least one lateral abutting surface for forming an abutting connection with an adjacently installed floor panel,
   wherein the at least one lateral abutting surface includes:
   a vertically oriented planar surface for abutting against a vertically oriented planar surface of an adjacent floor panel,
   a chamfer on a top side of the floor panel positioned above the vertically oriented planar surface such that the chamfers at upper ends of two of the lateral abutting surfaces of adjacent floor panels form a triangular-shaped recess at the top side of the floor panel, and
   a chamfer on a bottom side of the floor panel positioned below the vertically oriented planar surface such that the chamfers at lower ends of two of the lateral abutting surfaces of adjacent floor panel form a triangular-shaped recess at the bottom side of the floor panel, and
   wherein the floor panel has, along its lateral edges, tongue-and-groove profiles contrived in such a way that grooves and tongues on opposite lateral edges of adjacently installed floor panels are adapted to be horizontally pushed into each other in a non-locking manner, and
   wherein the grooves and tongues of the tongue-and-groove profiles each have an approximately trapezoidal cross-section with beveled flanks.

2. A floor panel according to claim 1:
   further comprising an elastic backing layer made from a polyurethane material and disposed beneath the core layer, and
   wherein the backing is formed by an underside of the elastic backing layer.

3. A floor panel according to claim 1, wherein the backing is formed by an underside of the core layer.

4. A floor panel according to claim 1, wherein the embossing has one of:
   a honeycomb structure and
   a pyramid structure.

5. A floor panel according to claim 1, wherein the chamfer on the bottom side of the floor panel is bigger than the chamfer on the top side of the floor panel.

6. A floor panel according to claim 1, wherein at least the core layer contains fillers in order to increase the weight thereof.

7. A floor panel according to claim 1, further comprising a glass-fiber mat which lies one of:
   on top of, and
   in,
the core layer.

8. A floor panel according to claim 1, further comprising a decorative layer and a transparent utility layer covering the decorative layer.

9. A floor panel according to claim 1, further comprising a textile layer forming a top side of the floor panel.

10. A floor panel according to claim 1, wherein the backing has a residual indentation pursuant to EN ISO 24343 of less than 0.1 mm.

11. A floor panel according to claim 1, wherein the floor panel has a Shore A hardness of 50 to 90.

\* \* \* \* \*